March 28, 1933.   C. COHEN-VENEZIAN   1,902,834

TAIL SUPPORTING TRUCK FOR AEROPLANES

Filed Feb. 25, 1931

Inventor,
C. Cohen-Venezian,
by E. F. Newdorth
Atty

Patented Mar. 28, 1933

1,902,834

UNITED STATES PATENT OFFICE

CARLO COHEN-VENEZIAN, OF TURIN, ITALY

TAIL-SUPPORTING TRUCK FOR AEROPLANES

Application filed February 25, 1931, Serial No. 518,189, and in Italy February 26, 1930.

The present invention relates to trucks intended to provide a running support for the tail of aeroplanes in their displacements on the ground, and has for its object a wheeled truck of such a type, in which the handling is made easy owing to the fact that the support intended to receive the tail shoe of the aeroplane is adjustable in a transverse direction, that is in the direction of the axis of the axle of truck wheels.

It is known that under given circumstances as when a damaged aeroplane is shifted by means of a four-wheel truck on which the fuselage of said aeroplane is fastened, the run of the aeroplane tail on the ordinary two-wheel trucks used for such a purpose is a difficult matter because owing to the unsatisfactory respective alignment of the two aeroplane carrying trucks, any lag or delay in adjustment of the tail supporting truck with respect to fuselage-carrying truck may injure the aeroplane fuselage in view of non-yielding action of the connecting members fastening said fuselage on the front four wheel truck.

The present invention has amongst its purposes to remove such drawback.

On the annexed drawing an embodiment of the present invention is shown by way of example and Figure 1 shows an aeroplane carried around or manœuvred by a four-wheel truck engaged with its fuselage and by a two wheel truck supporting the tail shoe of said aeroplane;

Figure 1:
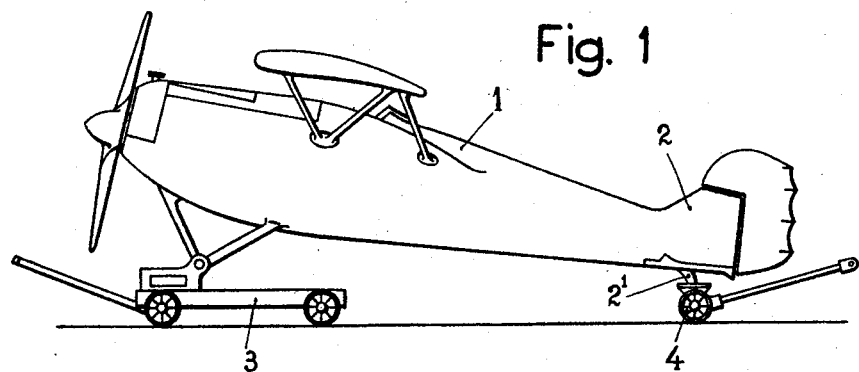
Figure 2:
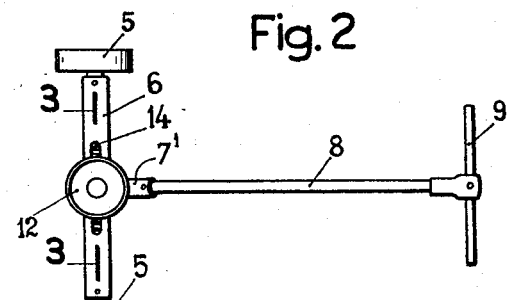
Figure 2 is a plan view of a two-wheel truck for aeroplane tail according to this invention.
Figure 3:
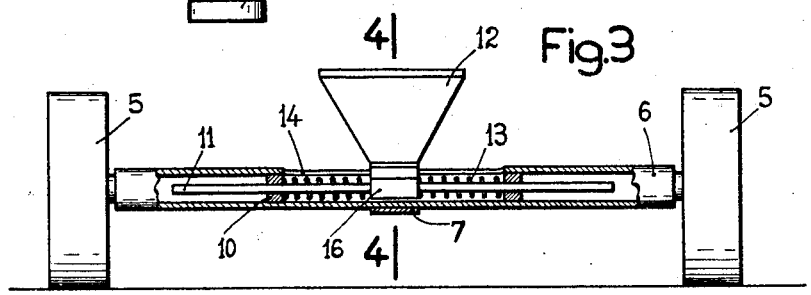
Figure 3 is a front view of said carriage on an enlarged scale with a portion of its axle in section on line 3—3 of Figure 2.
Figure 4:
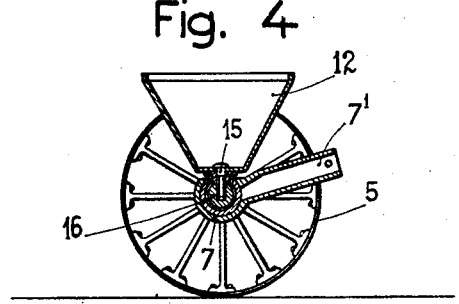
Figure 4 is a section on line 4—4 of Figure 3 with parts omitted.

As shown in Figure 1, when an aeroplane has its fuselage 1 fastened on a four-wheel truck as 3 and its tail portion 2 supported by tail shoe 2' on a two-wheel truck 4, any deviation of truck 3 from a straight path causes a material side displacement of the aeroplane tail which cannot be immediately followed by truck 4, and thus the aeroplane structure is subjected to heavy stresses and deformations.

Such a drawback is removed by the present invention which comprises a tail carrier mounted to move with respect to truck carrying it.

In the embodiment illustrated the tail supporting truck comprises two wheels 5—5 mounted at the ends of a hollow axle 6 which is embraced in its intermediate portion by a sleeve 7 providing a seat 7' in which a bar 8 having an end transverse handle 9 at its free end and providing a pole-bar for driving and steering the truck is mounted.

Said axle 6 is hollow and carries inside it supports 10 in which a rod 11 is mounted to reciprocate, said rod carrying a cup 12 or a suitable support fastened thereon by a collar 16 and a bolt 15 and adapted to receive the tail shoe of an aeroplane or another member of the aeroplane tail. A spring 13 is located intermediate each support 10 and cup 12, said cup 12 being thus resiliently held in a central position on axle 6.

Said hollow or tubular axle 6 has a longitudinal slot 14 affording passage for bolt 15 which engages said cup 12 and collar 16 on rod 11.

Of course the described arrangement may be modified in several manners as by way of example it may be carried by a collar mounted to reciprocate against spring action along a stationary rod 11.

When an aeroplane tail shoe as 2' is engaged in cup 12 said cup may easily provide for side displacements of the said tail against action of either of springs 13, as due to a side action of said aeroplane tail.

Therefore when the aeroplane fuselage is carried by a front truck (as 3 in Fig. 1) and it is deviated sidewise owing to deviations of said truck from rectilinear path no stress nor deformation is produced in the aeroplane fuselage and the aeroplane tail shoe is not caused to go off from cup 12 with inherent drawbacks, but on the contrary the cup 12 of rear truck is shifted in either direction.

On the other hand, such a deviation shows the operator that it is required to steer or manœuvre the rear truck to hold it on the line of the fuselage longitudinal axis, and when normal conditions are restored the cup 12 comes again in its central position on axle 6 under the action of springs 13.

The described truck is of large service and advantage in manoeuvring aeroplanes over the ground.

What I claim as my invention and desire to secure by United States Letters Patent is:

1. A two-wheel truck for supporting and shifting an aeroplane tail over the ground, comprising an axle, means for propelling and steering said axle, an aeroplane tail engaging member, means associated with said axle for mounting said member to move along a line substantially parallel with said axle, and spring means also associated with said axle for resiliently restricting said motion of said member in both directions.

2. A two-wheel truck for supporting and shifting an aeroplane tail over the ground, comprising an axle, means for propelling and steering said axle, an aeroplane tail engaging member, means for mounting said member to move along said axle, and spring means also associated with said axle for resiliently restricting said motion of said member in both directions.

3. A two-wheel truck for supporting and shifting an aeroplane tail over the ground, comprising a hollow axle having a longitudinal slot, means for propelling and steering said axle, an aeroplane-tail engaging member entering said slot and hollow axle, means in said hollow axle for supporting said member for motion along the axis of said axle and spring means in said hollow axle for resiliently restricting said motion of said member.

In testimony whereof I have signed my name to this specification.

CARLO COHEN-VENEZIAN.